(12) United States Patent
Baumgartner

(10) Patent No.: US 7,845,465 B2
(45) Date of Patent: Dec. 7, 2010

(54) VEHICULAR EXHAUST RESONATOR WITH COOLING FEATURE

(75) Inventor: Fred Baumgartner, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 12 days.

(21) Appl. No.: 12/200,012

(22) Filed: Aug. 28, 2008

(65) Prior Publication Data

US 2009/0057056 A1    Mar. 5, 2009

Related U.S. Application Data

(60) Provisional application No. 60/967,154, filed on Aug. 31, 2007.

(51) Int. Cl.
F01N 1/02 (2006.01)
F01N 1/14 (2006.01)
F01N 1/04 (2006.01)
F01N 1/00 (2006.01)

(52) U.S. Cl. .................... 181/249; 181/283; 181/262; 60/319

(58) Field of Classification Search ........... 181/249, 181/250, 247, 248, 283, 282, 255, 262; 60/319, 60/318, 317
See application file for complete search history.

(56) References Cited

U.S. PATENT DOCUMENTS

| | | | | |
|---|---|---|---|---|
| 1,217,615 A | * | 2/1917 | McDowell | 181/262 |
| 1,611,475 A | * | 12/1926 | Maxim | 181/249 |
| 1,638,087 A | * | 8/1927 | Clark | 181/263 |
| 1,654,078 A | * | 12/1927 | Hall | 181/262 |
| 1,897,746 A | * | 2/1933 | Winslow | 181/262 |
| 2,013,956 A | * | 9/1935 | Heath | 181/262 |
| 2,248,456 A | * | 7/1941 | Harris | 181/262 |
| 2,264,765 A | * | 12/1941 | Le Veque | 181/262 |
| 2,586,788 A | | 2/1952 | Cushman | |
| 2,661,072 A | * | 12/1953 | Lemmerman | 181/262 |
| 3,061,416 A | * | 10/1962 | Kazokas | 422/176 |
| 3,227,240 A | | 1/1966 | Lee et al. | |
| 3,468,397 A | * | 9/1969 | Vegeby | 181/252 |
| 3,471,265 A | * | 10/1969 | Baust et al. | 422/176 |
| 3,685,614 A | * | 8/1972 | Coanda et al. | 181/256 |
| 3,857,458 A | | 12/1974 | Ohtani et al. | |
| 3,899,923 A | * | 8/1975 | Teller | 73/116.03 |
| 4,024,698 A | * | 5/1977 | Weiss et al. | 57/305 |

(Continued)

FOREIGN PATENT DOCUMENTS

JP    2004-204802 A    7/2004

(Continued)

*Primary Examiner*—Edgardo San Martin
(74) *Attorney, Agent, or Firm*—Harness, Dickey & Pierce, P.L.C.

(57) ABSTRACT

A vehicular exhaust resonator features an exhaust inlet conduit which narrows down in a manner such as to define a venturi effect region. Air entrainment apertures in the housing of the resonator provide fluid communication between outside cooling air and an air inlet chamber in the resonator. A further air inlet aperture in an outlet conduit section of the resonator is in fluid communication with the air inlet chamber. Due to the venturi effect inside the inlet conduit, a pressure drop is created to pull air from the outside into the air inlet chamber and then into an outlet conduit of the resonator for mixing with the exhaust gas to provide cooling thereof.

20 Claims, 4 Drawing Sheets

U.S. PATENT DOCUMENTS

| | | | |
|---|---|---|---|
| 4,094,645 A * | 6/1978 | Bailey | 422/180 |
| 4,142,606 A * | 3/1979 | Vanderzanden et al. | 181/231 |
| 4,147,230 A * | 4/1979 | Ormond et al. | 181/231 |
| 4,198,817 A | 4/1980 | Fujita et al. | |
| 4,227,651 A * | 10/1980 | Abe | 239/428 |
| 4,265,332 A * | 5/1981 | Presnall et al. | 181/211 |
| 4,281,592 A * | 8/1981 | Maxson et al. | 454/266 |
| 4,308,930 A * | 1/1982 | Iida et al. | 180/89.2 |
| 4,361,206 A | 11/1982 | Tsai | |
| 4,487,289 A * | 12/1984 | Kicinski et al. | 181/252 |
| 5,123,501 A * | 6/1992 | Rothman et al. | 181/239 |
| 5,174,113 A * | 12/1992 | Deville | 60/309 |
| 7,413,716 B2 * | 8/2008 | Mavinahally et al. | 422/177 |
| 2004/0104071 A1 * | 6/2004 | Wahlstrom et al. | 181/248 |
| 2006/0277901 A1 * | 12/2006 | Allegre et al. | 60/317 |
| 2009/0113882 A1 * | 5/2009 | Gibson et al. | 60/319 |

FOREIGN PATENT DOCUMENTS

| | | |
|---|---|---|
| KR | 0124352 Y1 | 10/1998 |
| KR | 0323069 B1 | 2/2002 |
| KR | 10-2005-0061628 A | 6/2005 |

* cited by examiner

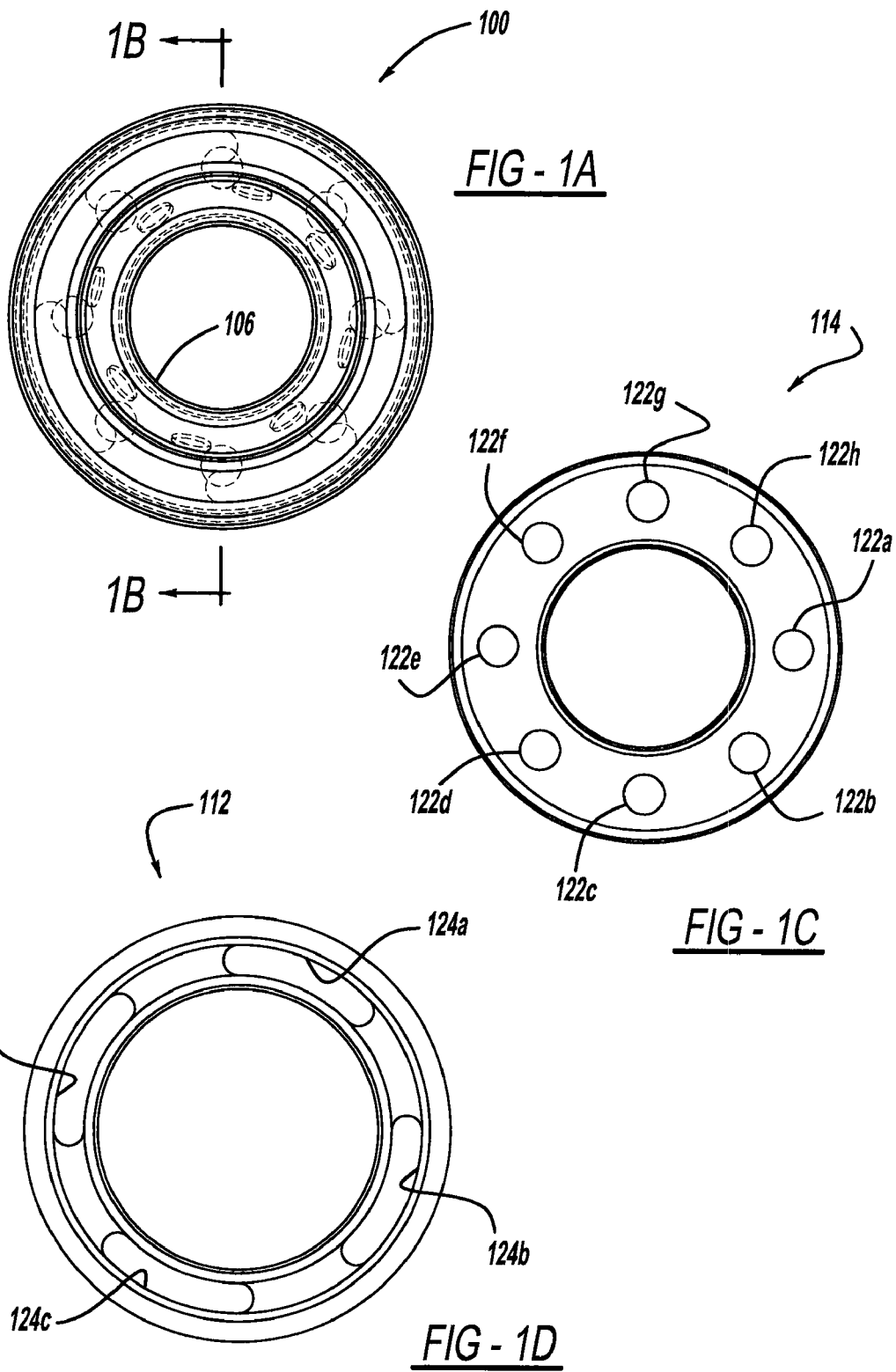

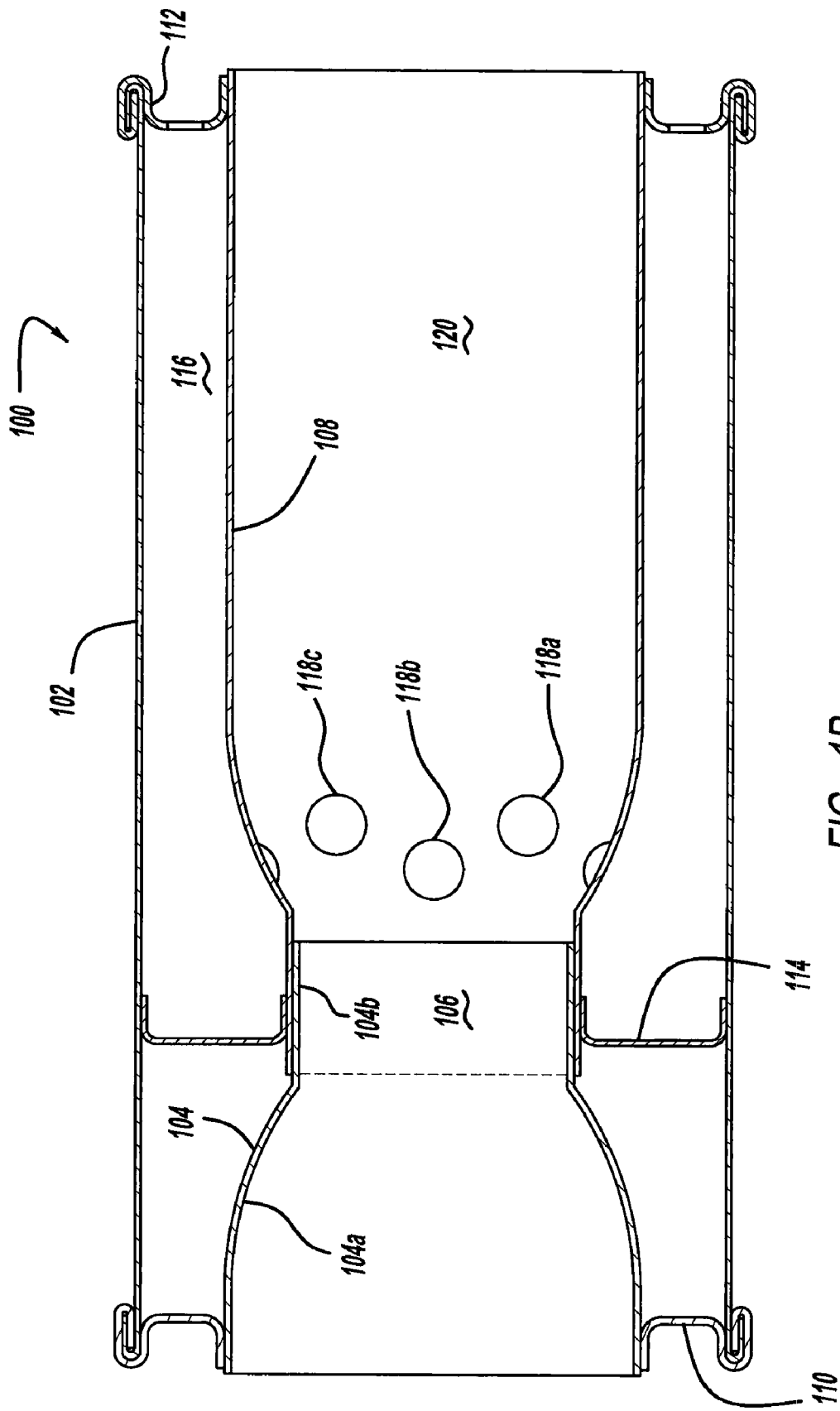

VEHICULAR EXHAUST RESONATOR WITH COOLING FEATURE

CROSS-REFERENCE TO RELATED APPLICATIONS

This application claims the benefit of U.S. Provisional Application No. 60/967,154, filed on Aug. 31, 2007. The entire disclosure of the above application is incorporated herein by reference.

FIELD

The present disclosure relates to vehicular exhaust treatment systems. More particularly, the present disclosure pertains to resonators employing arrangements for cooling vehicle engine exhaust passing through the resonator.

BACKGROUND

In vehicular exhaust treatment systems, high temperature exhaust gas poses problems with safety, durability and increased exhaust flow noise. In some vehicle applications, exhaust gas temperatures can become high at idle conditions, resulting in a need for exhaust cooling arrangements. Commonly used sound absorbing materials used in exhaust resonators may fail at increased exhaust temperatures resulting in undesirable exhaust sound levels. Furthermore, high temperature exhaust gas leads to decreased gas density, thus increasing exhaust gas velocity which creates high frequency flow noise. Exhaust treatment devices, such as resonators, therefore need to take those problems into account in their design.

SUMMARY

This section provides a general summary of the disclosure, and is not a comprehensive disclosure of its full scope or all of its features. A vehicular exhaust resonator includes a housing having a lateral surface, an inlet header and an outlet header positioned at opposite ends of the lateral surface. An exhaust inlet conduit has an inlet end at the exhaust inlet header for receipt of vehicle exhaust gas and an outlet end, a cross sectional area of the inlet being larger than a cross sectional area of the outlet end thereby creating a venturi effect region. An exhaust outlet conduit has an inlet end in fluid communication with the venturi effect region and an outlet end at an opening in the outlet header. The housing has an air entrainment opening for drawing cooling air into an inlet chamber, and the exhaust outlet conduit has an opening at the inlet end of the exhaust outlet conduit adjacent to the venturi effect region and in fluid communication with the inlet chamber for pulling air into the exhaust outlet conduit due to lowered pressure therein created by the venturi effect.

In another aspect of the disclosure, a vehicular exhaust resonator includes a housing having a lateral surface, an inlet header and an outlet header positioned at opposite ends of the lateral surface. An exhaust inlet conduit has an inlet end opening at the inlet header for receipt of vehicle exhaust gas and an outlet end, a cross sectional area of the inlet end being larger than a cross sectional area of the outlet end thereby creating a venturi effect region. An exhaust outlet conduit has an inlet end surrounding the venturi effect region and in fluid communication therewith and an outlet end at an opening in the outlet header. A partition in the housing has a central aperture for receipt of the venturi effect region and a radially outer section coupled to an interior surface of the lateral surface of the housing, the partition, the lateral surface and the outlet header defining an air inlet chamber surrounding the exhaust outlet conduit. A plurality of apertures in the outlet header are for receipt of outside air into the air inlet chamber. A plurality of apertures in the exhaust outlet conduit generally adjacent to the venturi region are arranged for pulling air from the air inlet chamber into the exhaust outlet conduit.

In a still further feature of the disclosure, a vehicular exhaust resonator includes a housing having a lateral surface, an inlet header and an outlet header positioned at opposite ends of the lateral surface. An exhaust inlet conduit has an inlet end opening at the inlet header for receipt of vehicle exhaust gas and an outlet end, a cross sectional area of the inlet end being larger than a cross sectional area of the outlet end thereby creating a venturi effect region. An exhaust outlet conduit has an inlet end larger in cross sectional area and surrounding the venturi effect region and in fluid communication therewith and an outlet end at an opening in the outlet header, a portion of the exhaust outlet conduit having perforations therethrough. A first partition in the housing has a central aperture for receipt of the venturi effect region and a radially outer section coupled to an interior surface of the lateral surface of the housing. A second partition in the housing is positioned downstream of the first partition and has a central aperture for receipt of the exhaust outlet conduit and a radially outer section coupled to the interior surface of the lateral surface of the housing, the first partition, the second partition and the lateral surface of the housing defining an air inlet chamber surrounding the venturi effect region and the inlet end of the exhaust outlet conduit. A plurality of apertures in the lateral surface of the housing are placed for receipt of outside air into the air inlet chamber. An open annular region of the inlet end of the exhaust outlet conduit is in fluid communication with the air inlet chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The objects and features of the disclosure will become apparent from a reading of the detailed description, taken in conjunction with the drawing, in which:

FIGS. 1A-1D depict various views of an embodiment of the disclosure; and

Corresponding reference numerals indicate corresponding parts throughout the several views of the drawings.

DETAILED DESCRIPTION

Figure 2A:
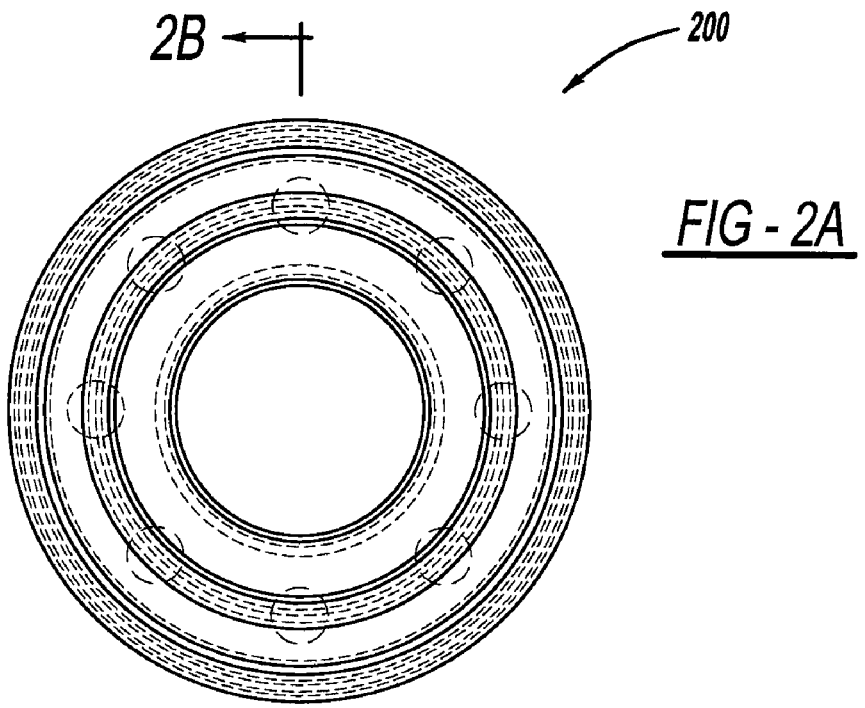
FIGS. 2A-2C depict various views of an alternative embodiment of the disclosure.

Example embodiments will now be described more fully with reference to the accompanying drawings.

A first embodiment of the disclosure is set forth in the various views of FIGS. 1A, B, C and D. With reference to FIGS. 1A-D, a vehicle exhaust resonator 100 has a shell casing or lateral surface 102 preferably circular in cross section, but of virtually any cross section shape. An exhaust inlet tube or conduit 104 has its largest cross section at the inlet end and arcuately tapers via wall 104a down to a smaller diameter area defined by linear wall 104b to define a venturi effect region 106. An exhaust outlet tube or conduit 108 surrounds venturi effect region 106 at an inlet end and arcuately expands in cross sectional area towards an outlet end to define a chamber 120. The inlet end of the resonator includes an inlet header or end cap 110 having a central aperture therein for receipt of the inlet end of exhaust inlet conduit 104. At an opposite end of the resonator an outlet header or end cap 112 has a central opening for receipt of the outlet end of exhaust outlet conduit 108. A partition or baffle 114 surrounds the venturi region 106 and is coupled at a radially outer section to an inner surface of the shell casing 102. A cooling air inlet chamber 116 is defined at one end by partition 114 and at an opposite end by outlet header 112.

As seen from FIG. 1D, outlet header 112 contains a plurality (for example four) of outside cooling air entrainment openings 124a-d for pulling cooling air into chamber 116.

Exhaust outlet conduit 108 has a plurality of air inlet openings through the wall of conduit 108 (three of which, 118a-c are shown) for drawing air from chamber 116 into a mixing chamber 120 inside of exhaust outlet conduit 108.

Partition 114, as seen in FIG. 1C, includes a plurality of tuning depressions or indentations 122a-h spaced around the partition 114.

In operation, vehicular exhaust gas from an engine enters exhaust inlet conduit 104, and, due to the venturi region 106, a region of low pressure in chamber 120 is created beneath apertures such as 118a-c to suck in cooling air from inlet chamber 116 into the mixing chamber 120, thereby cooling the exhaust flowing through the resonator.

Figure 2C:
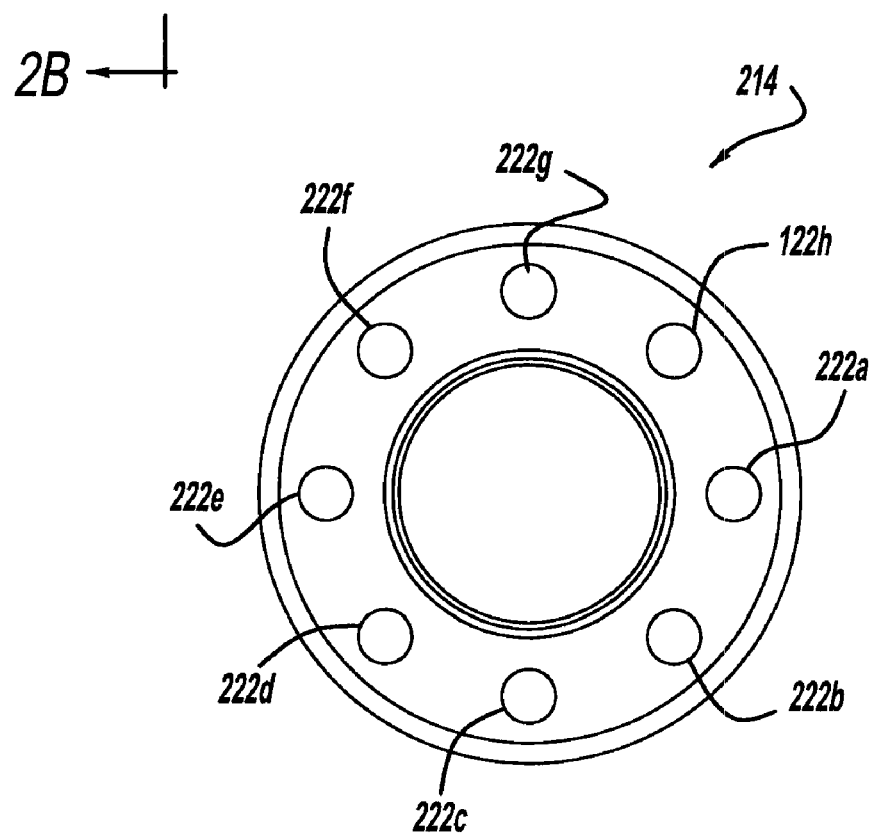
Figure 2B:
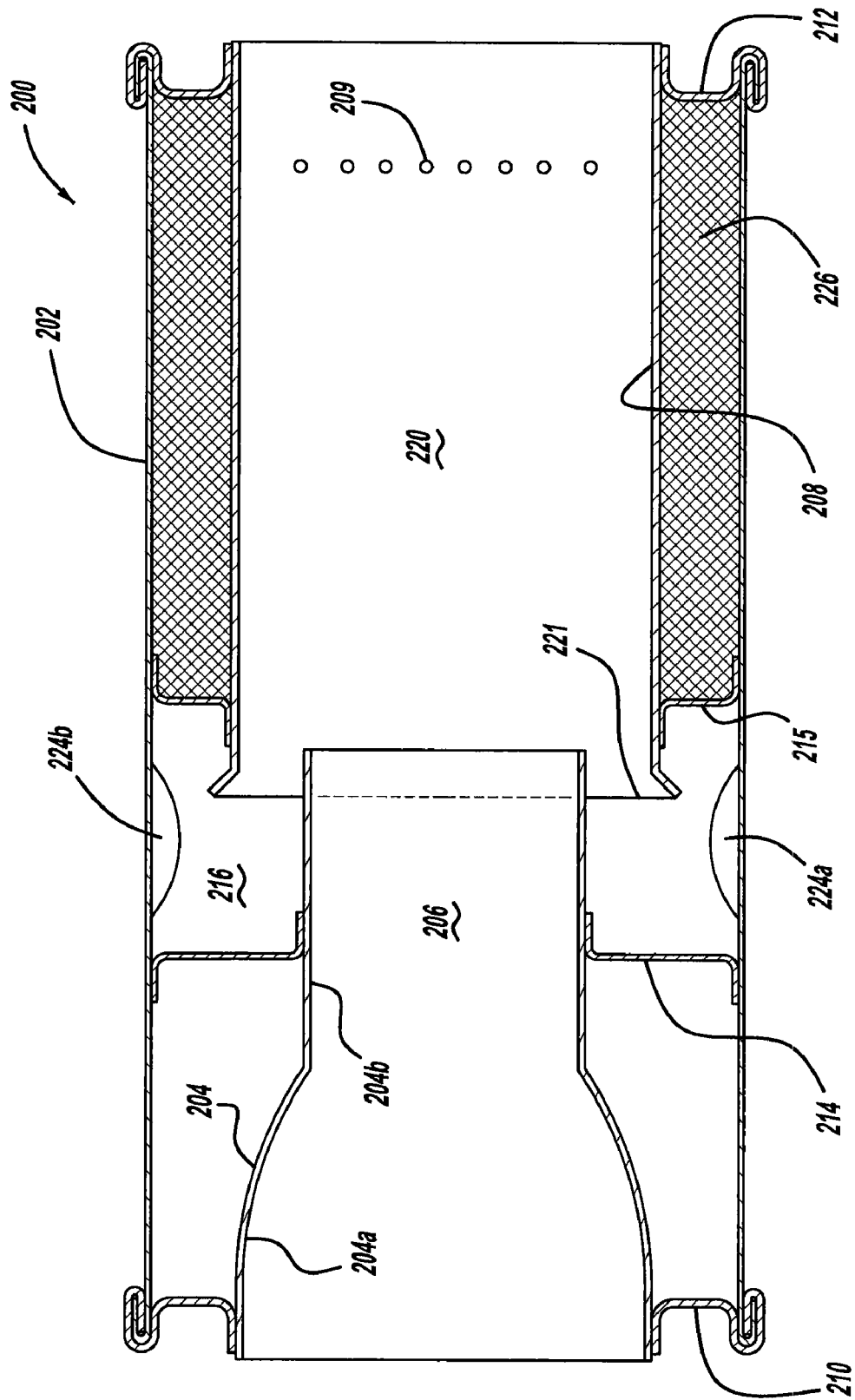

An alternative embodiment of a resonator is set forth in the various views of FIGS. 2A-2C. With reference to FIGS. 2A-2C, resonator 200 has a shell casing or outer lateral surface 202, preferably of a circular cross section but of virtually any shape cross section in accordance with the disclosure. The interior of the resonator is further defined by an inlet header 210 and an outlet header 212 at opposite ends of the shell casing or lateral surface 202.

An exhaust inlet tube 204 has an inlet end in a central opening of inlet header 210 and arcuately diminishes in cross sectional area along curved wall 204a to a linear section wall 204b which defines a venturi effect region 206.

An exhaust outlet tube 208 has an opening at its inlet surrounding the venturi effect region 206 and features an annular open space 221 in fluid communication with an air inlet chamber 216. The wall of exhaust outlet conduit 208 is perforated as at 209, and an outlet end of conduit 208 rests in an opening in outlet header 212.

Outside cooling air is drawn into inlet chamber 216 via a plurality of air entrainment apertures (two of which, apertures 224a-b, are shown) in shell casing or lateral surface 202.

Air inlet chamber 216 is defined by lateral surface 202, a first partition 214 and a second partition 215 spaced downstream of first partition 214. The annular area defined between second partition 215, outlet header 212 and lateral surface 202 is filled with a sound absorbing material 226 which surrounds exhaust outlet conduit 208 in the area of its perforations 209.

Partition 214 (and optionally partition 215), as seen from FIG. 2C includes a plurality of tuning depressions or indentations 222a-h.

In operation, resonator 200 receives vehicular exhaust gas at the inlet end of exhaust inlet conduit 204. The exhaust flow due to the narrowing-down region at venturi section 206 creates a pressure drop at the inlet end of exhaust outlet conduit 208 thereby drawing in air from chamber 216 into chamber 220 for mixing with the exhaust gas flowing through the resonator.

Therefore, in both embodiments of FIGS. 1A-1D and FIGS. 2A-2C, the exhaust flowing through resonator is cooled by outside air drawn into the chamber defined by the exhaust outlet conduit.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A vehicular exhaust resonator comprising:
    a housing having a lateral surface, an inlet header and an outlet header positioned at opposite ends of the lateral surface;
    an exhaust inlet conduit having an inlet end opening at the inlet header for receipt of vehicle exhaust gas and an outlet end, a cross-sectional area of the inlet end being larger than a cross-sectional area of the outlet end thereby creating a venturi effect region;
    an exhaust outlet conduit having an inlet end larger in cross-sectional area than and being in receipt of the outlet end of the exhaust inlet conduit, the exhaust outlet conduit having an outlet end at an opening in the outlet header and a portion having perforations therethrough;
    a first partition in the housing having a central aperture for receipt of the venturi effect region and a radially outer section coupled to an interior surface of the lateral surface of the housing;
    a second partition in the housing positioned downstream of the first partition and having a central aperture for receipt of the exhaust outlet conduit and a radially outer section coupled to the interior surface of the lateral surface of the housing, the first partition, the second partition and the lateral surface of the housing defining an air inlet chamber surrounding the venturi effect region and the inlet end of the exhaust outlet conduit;
    a plurality of apertures in the lateral surface of the housing for receipt of outside air into the air inlet chamber; and
    an open annular region of the inlet end of the exhaust outlet conduit in fluid communication with the air inlet chamber.

2. The resonator of claim 1 wherein the first partition further includes a plurality of tuning indentations therein.

3. The resonator of claim 1 wherein the second partition further defines a wall of a cavity containing a sound absorbing material, the perforations being in fluid communication with the cavity.

4. The resonator of claim 3 wherein the second partition, the outlet header, the exhaust outlet conduit and the housing define the cavity.

5. The resonator of claim 1 wherein the exhaust outlet conduit includes a substantially constant cross section from the outlet end of the exhaust inlet conduit to the outlet header.

6. The resonator of claim 1 wherein the exhaust inlet conduit includes a wall having a concave curved cross-section.

7. The resonator of claim 1 wherein the apertures in the lateral surface are circumferentially spaced apart from one another.

8. The resonator of claim 1 wherein the plurality of apertures in the lateral surface are positioned at a location upstream from the outlet end of the exhaust inlet conduit.

9. A vehicular exhaust resonator comprising:

A housing having a lateral surface, an inlet header and an outlet header positioned at opposite ends of the lateral surface;

an exhaust inlet conduit having an inlet end at the inlet header for receipt of vehicle exhaust gas and an outlet end, a cross-sectional area of the inlet end being larger than a cross-sectional area of the outlet end thereby creating a venturi effect region; and an exhaust outlet conduit spaced apart from the inlet conduit, the exhaust outlet conduit having an inlet end in fluid communication with the venturi effect region and an outlet end at an opening in the outlet header;

wherein the housing has an air entrainment opening positioned adjacent to the inlet end of the exhaust outlet conduit for drawing cooling air into an inlet chamber, and the exhaust outlet conduit has an opening adjacent to the venturi effect region in fluid communication with the inlet chamber for pulling air into the exhaust outlet conduit due to lowered pressure therein created by the venturi effect.

10. The resonator of claim 9 wherein a portion of the exhaust outlet conduit surrounds the exhaust inlet conduit to define an annular space therebetween.

11. The resonator of claim 10 wherein the cooling air is drawn from the inlet chamber, through the annular space and into the exhaust outlet conduit by the venturi effect.

12. The resonator of claim 9 wherein the exhaust outlet conduit includes a substantially constant diameter extending from a location downstream of the venturi effect region to the outlet header.

13. The resonator of claim 9 wherein the exhaust outlet conduit opening is positioned at a terminal end of the exhaust outlet conduit.

14. The resonator of claim 9 wherein the air entrainment opening is formed in the lateral surface of the housing.

15. The resonator of claim 9 wherein at least a portion of the exhaust outlet conduit is perforated and surrounded by sound absorbing material placed between the exhaust outlet conduit and the lateral surface of the housing.

16. The resonator of claim 15 wherein the inlet chamber is positioned upstream of the sound absorbing material.

17. A vehicular exhaust resonator comprising:

a housing having a lateral surface, an inlet header and an outlet header positioned at opposite ends of the lateral surface;

an exhaust inlet conduit having an inlet end opening at the inlet header for receipt of vehicle exhaust gas and an outlet end, a cross-sectional area of the inlet end being larger than a cross-sectional area of the outlet end thereby creating a venturi effect region;

an exhaust outlet conduit having an inlet end larger in cross-sectional area and surrounding the venturi effect region and in fluid communication therewith and an outlet end at an opening in the outlet header, a portion of the exhaust outlet conduit having perforations therethrough;

a first partition in the housing having a central aperture for receipt of the venturi effect region and a radially outer section coupled to an interior surface of the lateral surface of the housing;

a second partition in the housing positioned downstream of the first partition and having a central aperture for receipt of the exhaust outlet conduit and a radially outer section coupled to the interior surface of the lateral surface of the housing, the first partition, the second partition and the lateral surface of the housing defining an air inlet chamber surrounding the venturi effect region and the inlet end of the exhaust outlet conduit, wherein the second partition, the outlet header, the exhaust outlet conduit and the housing define a cavity containing a sound absorbing material, the perforations being in fluid communication with the cavity;

a plurality of apertures in the lateral surface of the housing for receipt of outside air into the air inlet chamber; and an open annular region of the inlet end of the exhaust outlet conduit in fluid communication with the air inlet chamber.

18. The resonator of claim 17 wherein the exhaust outlet conduit includes a substantially constant cross-section from the outlet end of the exhaust inlet conduit to the outlet header.

19. The resonator of claim 17 wherein the exhaust inlet conduit includes a wall having a concave curved cross-section.

20. The resonator of claim 17 wherein the plurality of apertures in the lateral surface are positioned at a location upstream from the outlet end of the exhaust inlet conduit.

* * * * *

UNITED STATES PATENT AND TRADEMARK OFFICE
CERTIFICATE OF CORRECTION

PATENT NO.       : 7,845,465 B2
APPLICATION NO.  : 12/200012
DATED            : December 7, 2010
INVENTOR(S)      : Fred Baumgartner It is certified that error appears in the above-identified patent and that said Letters Patent is hereby corrected as shown below:

Title Page: (56) References Cited, U.S. Patent Documents, Col. 2, Reference No. 12

"3,471,265 A * 10/1969 Baust et al." should be --3,471,265 A * 10/1969 Ciapetta et al.--

Signed and Sealed this
Twentieth Day of March, 2012

David J. Kappos
*Director of the United States Patent and Trademark Office*